(12) United States Patent
Porcino

(10) Patent No.: US 6,904,102 B2
(45) Date of Patent: Jun. 7, 2005

(54) METHOD OF, AND RECEIVER FOR, DETECTING THE PRESENCE OF DATA

(75) Inventor: Domenico G. Porcino, Horley (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 798 days.

(21) Appl. No.: 09/801,600

(22) Filed: Mar. 8, 2001

(65) Prior Publication Data

US 2001/0022790 A1 Sep. 20, 2001

(30) Foreign Application Priority Data

Mar. 9, 2000 (GB) .............................................. 0005591

(51) Int. Cl.[7] .......................... H03K 9/00; H04L 27/06; H04L 27/14; H04L 27/22
(52) U.S. Cl. ..................................................... 375/316
(58) Field of Search ................................. 375/272, 316, 375/324, 325, 330, 334, 340

(56) References Cited

U.S. PATENT DOCUMENTS

| | | | | |
|---|---|---|---|---|
| 5,757,845 A | * | 5/1998 | Fukawa et al. ............. | 375/152 |
| 5,838,742 A | * | 11/1998 | Abu-Dayya .................. | 375/347 |
| 5,917,794 A | * | 6/1999 | Honma ....................... | 369/59.15 |
| 5,991,273 A | * | 11/1999 | Abu-Dayya .................. | 370/252 |
| 6,069,912 A | * | 5/2000 | Sawahashi et al. ......... | 375/142 |
| 6,081,548 A | * | 6/2000 | Saito .......................... | 375/130 |
| 6,363,084 B1 | * | 3/2002 | Dejonghe .................... | 370/480 |
| 6,577,686 B1 | * | 6/2003 | Koga et al. .................. | 375/347 |

* cited by examiner

Primary Examiner—Jean B. Corrielus
(74) Attorney, Agent, or Firm—Aaron Waxler

(57) ABSTRACT

A method of, and a receiver for, detecting the presence of digitally modulated data signals in which the receiver is periodically energised to detect the presence of the signals. The received signals/noise are converted using a quadrature frequency translation stage (16, 17, 18) into a complex signal which after differential decoding (28) contain n samples for each transmitted bit. A running sum of successive groups of m samples, where m<n, is obtained and an absolute value (Xi) of each group is derived. A weighting value (Wi) is selected by comparing each absolute value with predetermined statistics of expected values and the weighting value selected is multiplied by the associated absolute value to produce a product (S). The product is compared in a comparator (56) with a further threshold level (58) to derive an indication of the presence of data in the received signals. If the indication is negative the receiver is powered down to save power.

8 Claims, 2 Drawing Sheets

METHOD OF, AND RECEIVER FOR, DETECTING THE PRESENCE OF DATA

Figure 1:
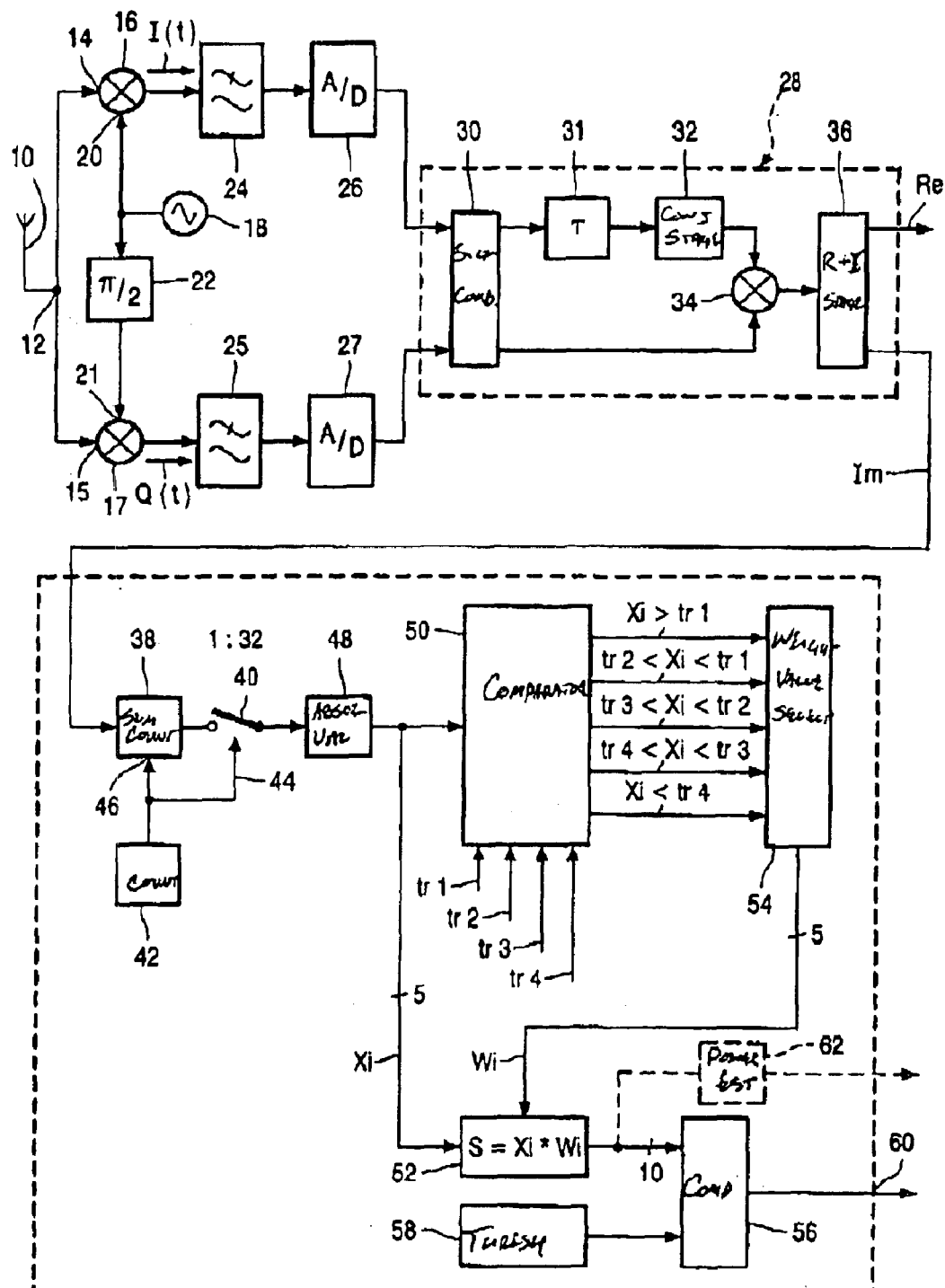

The present invention relates to a method of, and receiver for, detecting the presence of a data signal. Such a receiver is typically a receiver section of a telemetry module used for applications such as automatic water metering.

Telemetry modules are installed in equipment which may be continuously in use for many years without being serviced. In the case of battery powered telemetry modules it is desirable for them to operate for up to 10 years between battery replacements. To be able to achieve such long service lives the telemetry modules operate in accordance with a protocol facilitating current saving whilst giving an adequate response time. Protocols achieving these objectives are well known in various technical fields such as digital paging in which the CCIR Radiopaging Code No. 1, alternatively known as POCSAG, has been in use for nearly 20 years. The general approach followed is that the radio unit "sleeps" for long periods of time but wakes up periodically to check if there are any data signals being transmitted on its channel. The wake-up period may be preset independently of whether or not signals are present. In a refinement of this type of battery economy protocol, when the radio unit has been woken-up, it checks for the presence of data before energising the entire receiver and if none is detected within a period of time which is shorter than the preset period, it powers down prematurely.

If the radio unit is unreliable in detecting data then firstly there is a probability of a false alarm (P(false alarm) or P(fa) for short) which is defined as the probability that a signal is "detected" by a data presence detector, even when only noise is present, and secondly there is a probability of false dismissal (P(false dismissal) or P(fd) in short) which is defined as the probability that the data presence detector rejects a good signal and takes it for noise. P(fd) is a more critical parameter because every single false dismissal of data will cause a complete loss of a packet. Typical system requirements are: $P(fa) \leq 1\%$ and $P(fd) \leq 0.1\%$ An object of the present invention is to optimise the detection of the data presence for the shortest possible time that guarantees the minimum reliability required whilst minimising the energy requirements.

According to a first aspect of the present invention there is provided a method of detecting the presence of digitally modulated data signals, the method including differentially decoding the digitally modulated signals into oversampled complex signals comprising n samples per bit, forming a running sum of successive groups of m samples, where m is less than n, deriving an absolute value for the successive running sums, weighting the absolute value and determining the presence of data by comparing the weighted absolute value with a threshold level.

According to a second aspect of the present invention there is provided a receiver comprising means for receiving a digitally modulated signal, means for forming the digitally modulated signal into an oversampled, differentially decoded complex signal comprising a stream of n samples per bit, means for forming a running sum of successive groups of m samples, where m is less than n, means for deriving an absolute value for successive running sums, weighting means for weighting the respective absolute values, and a comparator for comparing the weighted absolute value with a threshold level and providing an output indicative of the presence of data in the received signals.

The present invention is based on a mechanism which comprises adding up the absolute value of the incoming signal, sample by sample, until a fixed threshold is reached or a time-out instant has passed. In the first case one can be sure that a signal is present and in the second case one can be certain that a signal is not present. In a refinement of the basic mechanism some account is taken of the previous samples' history and their value when combined with others. As a consequence of this single samples are not considered but rather groups of samples collected together.

In the case of the data signals being 2-FSK signals, the running sum is made of the differentially decoded samples contained in the imaginary constellation. An advantage of choosing the imaginary constellation is that a faster result is obtained compared to a known technique in which the sum of the squares of I and Q signals is compared with a threshold value.

Figure 2:
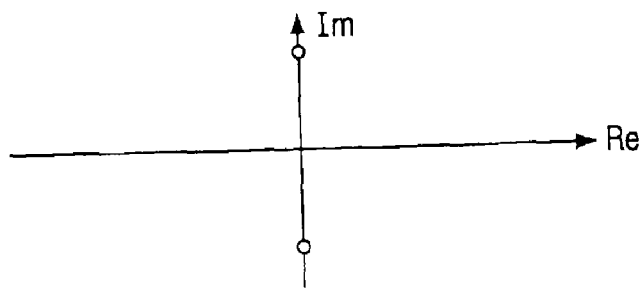
Figure 3:
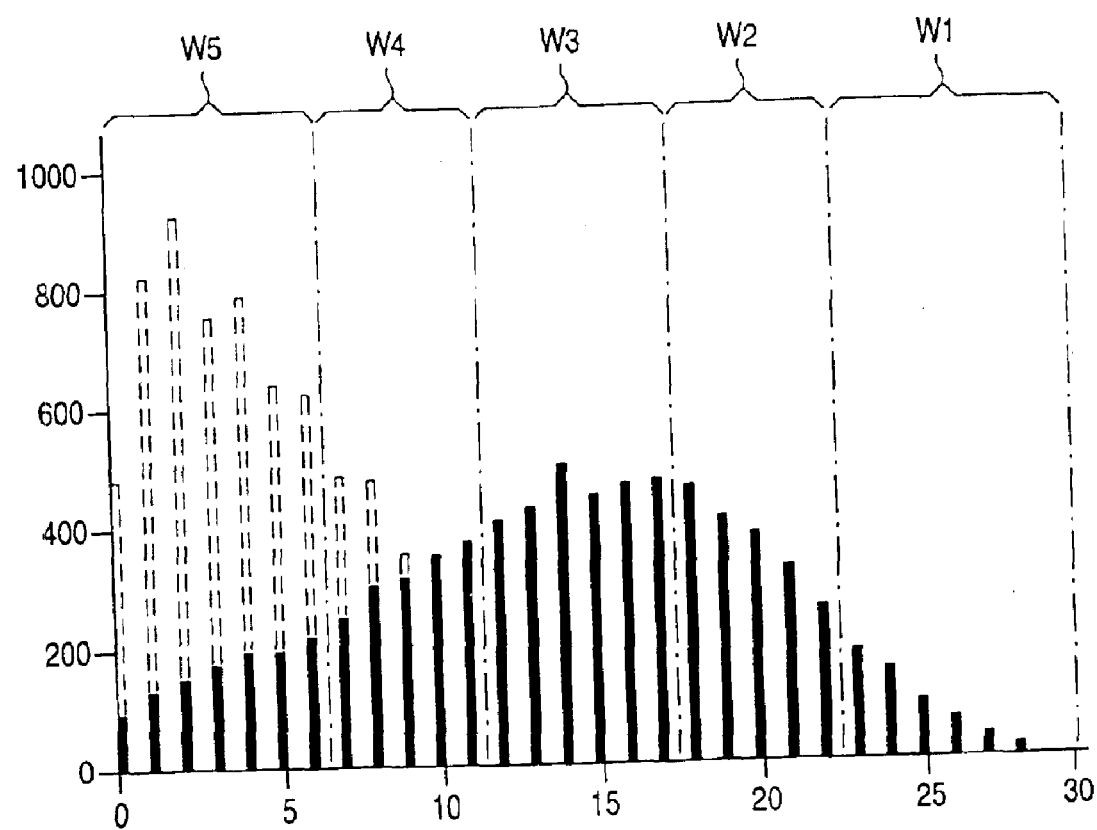

The present invention will now be described, by way of example, with reference to the accompanying drawings, wherein:

FIG. 1 is a block schematic diagram of a receiver made in accordance with the present invention for use with a 2-FSK signal FIG. 2 illustrates a constellation of 2-FSK demodulated data, and FIG. 3 illustrates a statistical distribution of a counter value in the presence of signal and noise together with an indication of the weights Wi assigned to each group or window; the abscissa represents the counter value and the ordinate the number of occurrences.

The receiver shown in FIG. 1 may be an independent receiver or the receiver section of a transceiver embodied in a telemetry module. For convenience both arrangements will be described as a receiver.

The receiver operates in accordance with a battery economising protocol whereby it is periodically woken-up from a sleep mode in which only those parts of the receiver essential to maintaining the receiver functional in its sleep state are energised.

An antenna 10 is coupled to a signal splitter 12 which supplies an input signal to first inputs 14, 15 of mixers 16, 17. A local oscillator 18 is coupled to a second input 20 of the mixer 16 and, by way of a quadrature phase shifter 22, to a second input 21 of the mixer 17. The frequency of the local oscillator 18 is selected to translate the signal received at the antenna 10 down to either a zero IF or low IF. The output from the mixer 16 is designated the in-phase signal I(t) and the output from the mixer 17 is designated the quadrature phase signal Q(t).

The in-phase and quadrature phase signals I(t) and Q(t) are respectively filtered and digitised in low pass filters 24, 25 and analogue to digital converters (ADC) 26, 27.

The ADCs 26, 27 oversample the signals I(t) and Q(t) and the samples are applied to a differential decoder 28. For example if the data rate is 150 bits/s and the sampling frequency is 76.8 kHz, the oversampling rate is 512 samples per bit. The differential decoder 28 is of a known design and comprises a complex signal combiner 30 having a first output coupled by way of a delay stage 31 and a complex conjugate stage 32 to a first input of a multiplier 34 and a second output coupled directly to a second input of the multiplier 34. An output of the multiplier 34 is applied to a complex real and imaginary stage 36 which supplies a real output Re and an imaginary output Im both at the oversampled bit rate.

Referring to FIG. 2 for a moment, the main aim of the data presence indicator circuit DPI (FIG. 1) is to distinguish signal from noise. In order to make the DPI circuit more efficient in the case of 2-FSK modulated transmissions the information available on the constellation expected for the demodulated digital signal is used. As shown in FIG. 2 the constellation of the decoded signals lies entirely on the imaginary branch Im. Therefore integrating the data registered on the real channel Re, which is similar to pure noise, is not beneficial insofar as 2-FSK is concerned. By neglecting the contribution from the real channel, the speed of the detection process is increased with respect to known methods. For multilevel modulation schemes it will be necessary to include the contribution from both the real (Re) and imaginary (Im) outputs.

Referring back to FIG. 1, the oversampled imaginary output Im is supplied to a data presence indicator circuit DPI. The samples are supplied to a running sum counter 38, the output of which is coupled to a normally open switch 40. A counter 42 counts 32 samples and on the 32nd count it produces an output which is supplied firstly to a control input 44 of the switch 40 causing it to close transferring the running sum count to an absolute value stage 48 and secondly to a reset input 46 of the counter 38 to reset the count to zero. The absolute value count Xi from the stage 48 is supplied to a comparator 50 and to a multiplying stage 52 in which it is multiplied by a weighting value Wi.

Four threshold values tr1 to tr4 are supplied to respective inputs of the comparator 50 which has five outputs respectively for the conditions: $X_i$>tr1; tr2<Xi<tr1; tr3<Xi<tr2; tr4<Xi<tr3 and Xi<tr4. A weighting value selecting stage 54 has inputs coupled to each of the five outputs of the comparator 50 and selects a weighting value Wi in response to which one of the five outputs is active.

The product S=Xi*Wi is supplied to another comparator 56 in which it is compared to a threshold value supplied by a threshold stage 58. If the threshold is exceeded then an output 60 of the comparator 56 will carry a data present signal in which case the receiver will stay awake. If the threshold is not exceeded, the data presence indicator DPI will time-out and the receiver reverts to a sleep mode before the expiry of its wake-up period.

Referring to FIG. 3, the drawing shows histograms of values of the running sum counts from the counter 28 after the counting of 32 samples. The counts will vary between 0 and 32. The distribution of noise counts, that is, counts in the presence of noise only on the air, is shown by the short broken lines and the solid black lines show the distribution of the signal counts.

By knowing in advance that the expected value of the counter 38 in the case of a signal will be very different (and generally higher) from the expected count in the case of noise. This information is used to advantage in weighting the results of different measurements according to the degree of confidence assigned to them.

As an example of a general case, the data is oversampled in a way that the typical data period will be n samples long and this data period is divided into groups or windows of in consecutive samples, with m<n. In the present example n=512 samples per bit and m=32 samples. In the embodiment shown in FIG. 1, each window of m samples is considered independently from the preceding and succeeding windows, which allows a short history contribution. The value of the counter for each group of m samples will be between 0 and m. This number is weighted according to the distribution of the data in the histogram shown in FIG. 3. In FIG. 3 getting a value of correlation bigger than 15 out of 32 will give a high probability that this is due to signal and not noise. Therefore this information can be weighted higher than information coming from a counter value of 10. Thus the values of tr1 to tr4 in FIG. 1 define various break points in the counter values and the weighting values W1 to W5 (FIG. 3) are assigned to the various bands in dependence on the confidence chosen.

Other methods of weighting can be employed besides the method just described. As a general rule the weighting Wi=f (correlation values) where the function can be any suitable linear or non-linear function appropriately designed according to the knowledge of distribution of the counter values in predefined conditions such as noise only or different signal power levels.

The method of weighting need not require counter values to be compared with threshold values. If the distribution of counts is Gaussian then the weighting can be determined from:

$$W(x) = \frac{e^{(x-m)^2/2\sigma^2}}{\sqrt{2\pi\sigma^2}}$$

where x is the absolute value counter value and σ is the variance.

In another variant the weighting may be a square relationship, $W(x)=x^2$ where x is the absolute value counter value.

As a consequence of weighting the counter values the operation of the data presence indicator is faster compared to a known technique based on obtaining the sum of the squares of the quadrature components and comparing this with a threshold value and its reliability is high. Because this method is faster battery saving is enhanced considerably.

The data presence indicator DPI may optionally include a power level estimator 62.

The power level estimator 62, which is coupled to the output of the multiplying stage 52, can be implemented as a running average stage and the longer it is active, the higher the quality of the estimate obtained. For example a 1 dB resolution can be obtained by averaging over a period corresponding to 2 to 3 detection periods. The lower level estimator itself will be the output of a counter having a variable slope depending on the quality of the data. The faster the slope of the ramp, the higher is the signal power. Simple averaging the counter values will give an accurate estimate of the input power.

Although the embodiment of the present invention has been described with reference to 2-FSK modulation, the teachings of the present invention can be applied to higher levels of modulation in which case both the real output Re and the imaginary output Im have to be used by the DPI.

In the present specification and claims the word "a" or "an" preceding an element does not exclude the presence of a plurality of such elements. Further, the word "comprising" does not exclude the presence of other elements or steps than those listed.

From reading the present disclosure, other modifications will be apparent to persons skilled in the art. Such modifications may involve other features which are already known in the design, manufacture and use of receivers having a data presence indicator stage and component parts therefor and which may be used instead of or in addition to features already described herein.

What is claimed is:

1. A method of detecting the presence of digitally modulated data signals, the method including differentially decoding the digitally modulated signals into oversampled complex signals comprising n samples per bit, forming successive running sums of groups of m samples, each where m is less than n, deriving an absolute value for each successive running sum, weighting each absolute value and determining the presence of data by comparing each weighted absolute value with a threshold level.

2. A method as claimed in claim 1, wherein the absolute values are weighted by comparing each absolute value with a plurality of threshold values of different magnitudes, the difference between threshold values of successive magnitudes comprising a window having a weighting value assigned to it, and in that each weighted absolute value is a product of a respective absolute value and a corresponding determined weighting value.

3. A method as claimed in claim 2, further comprising estimating a power level from said respective product of the absolute value and said corresponding determined weighting value.

4. A method as claimed in claim 1 or 2 wherein the digitally modulated signals comprise 2-FSK signals, characterised in that a constellation containing differentially decoded imaginary values is used to form the running sums.

5. A receiver comprising means for receiving a digitally modulated signal, means for forming the digitally modulated signal into an oversampled, differentially decoded complex signal comprising a stream of n samples per bit, means for forming successive running sums of groups of m samples, each where m is less than n, means for deriving a respective absolute value for each successive running sum, weighting means for weighting each respective absolute value, and a comparator for comparing the weighted absolute value with a threshold level and providing an output indicative of the presence of data in the received signal.

6. A receiver as claimed in claim 5, characterized in that the weighting means comprises comparing means for comparing each absolute value with a plurality of threshold values and mean for selecting a weighting value based on the result of the comparison outputs by said comparing means, and in that multiplying means are provided for forming each weighted absolute value as a product of a respective absolute value and a corresponding selected weighting value.

7. A receiver as claimed in claim 5, further comprising a power level estimator coupled to an output of the multiplying means.

8. A receiver as claimed in claim 5 or 6, fabricated as an integrated circuit.

\* \* \* \* \*